M. C. THOMAS.
NUT LOCK.
APPLICATION FILED JUNE 9, 1910.
994,798.
Patented June 13, 1911.
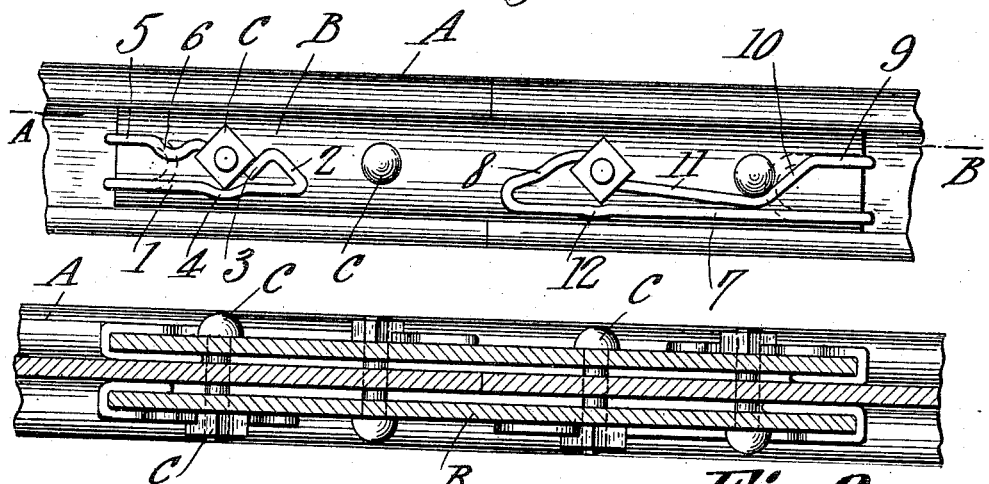
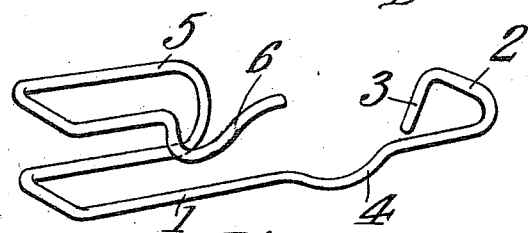
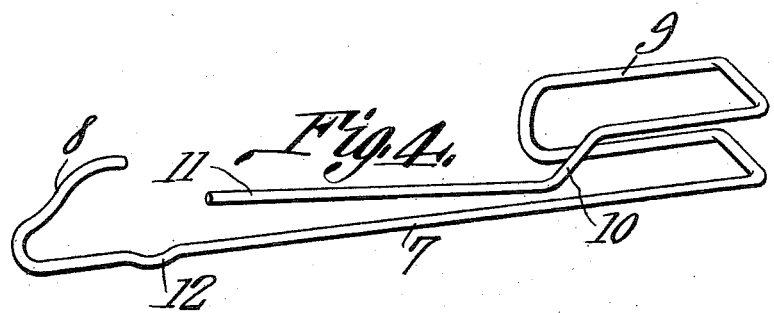
Witnesses
Milton C. Thomas,
Inventor
by C. A. Snow & Co.
Attorneys

UNITED STATES PATENT OFFICE.

MILTON C. THOMAS, OF MOUNT PLEASANT, IOWA.

NUT-LOCK.

994,798.                    Specification of Letters Patent.    Patented June 13, 1911.

Application filed June 9, 1910.   Serial No. 565,992.

*To all whom it may concern:*

Be it known that I, MILTON C. THOMAS, a citizen of the United States, residing at Mount Pleasant, in the county of Henry and State of Iowa, have invented a new and useful Nut-Lock, of which the following is a specification.

This invention relates to nut locks for use at rail joints and has for its object the provision of a simple form of nut engaging clip adapted to be applied to a fish plate and which will securely hold the nut against rotation in one direction.

A further object is to provide a lock which is cheap to manufacture and which can be readily applied.

With these and other objects in view the invention consists in certain novel details of construction and combinations of parts hereinafter more fully described and pointed out in the claims.

In the accompanying drawings the preferred forms of the invention have been shown.

In said drawings:—Figure 1 is a side elevation of a rail joint having the nut locks applied to the fish plates. Fig. 2 is a section on line A—B Fig. 1. Fig. 3 is a perspective view of one of the nut locks.
Fig. 4 is a perspective view of the other form of nut lock used upon the fish plates.

Referring to the figures by characters of reference A designates rails having the ordinary forms of fish plates B secured thereto by means of bolts C, these bolts being extended alternately through the rails and fish plates from opposite sides thereof. The fish plates B are spaced at their centers from the webs of the rails as ordinarily, and these faces are adapted to receive the engaging portions of the nut locks constituting the present invention. Two forms of nut lock are to be used in connection with each fish plate, one nut lock being placed in engagement with each end of the fish plate. When the nut to be locked is located next to one end of the fish plate, as shown at the left of Figs. 1 and 2, it is designed to employ a lock such as has been shown in detail in Fig. 3. This lock consists of a single length of heavy wire forming an arm 1, one end of which is extended upwardly at an incline as shown at 2 and thence downwardly as at 3 to form a substantially triangular yielding extension, the downwardly projecting portion 3 constitut-
ing an abutment for the nut c. A depression 4 is formed in the arm 1 adjacent the downwardly extending portion 3 and is adapted to receive a corner of the nut c as shown in Fig. 1. A loop 5 is formed at that end of the arm 1 farthest removed from the triangular extension, and this loop is bent so as to lie parallel with the arm 1. The free end of the loop extends over and parallel with the arm and terminates in a curved tongue 6 which extends downwardly from the end of the loop and then upwardly toward the apex of the extension at the far end of the arm 1. The depression 4 is located between this tongue 6 and the extension 3. In applying this form of lock to the fish plate, the loop 5 is inserted between the fish plate and the web of the rail A and thus acts as a hook for holding the arm 1 and tongue 6 upon the outer surface of the fish plate. The nut c is screwed onto the bolt and will spring the extension 3 and the tongue 6 out of its path while it is being tightened but rotation of the nut in the opposite direction will be prevented by the end of the tongue 6 which, as shown in Fig. 1, engages the nut. Moreover the extension 3 bears firmly against the nut and further assists in holding the nut against unscrewing from its bolt.

When the nut to be secured is on the second bolt from one end of the fish plate, as shown at the right of Figs. 1 and 2, it is designed to employ a lock such as is illustrated in detail in Fig. 4. This lock is also formed in a single length of heavy wire bent to form an elongated arm 7 having an upstanding curved tongue 8 at one end while a hooked loop 9 similar to the loop 5, is formed at the other end thereof, this loop having its free end bent downwardly as at 10 and then extending upwardly at an incline to the arm 7 and toward the tongue 8 to form an abutment, as shown at 11. In applying this form of lock, the loop 9 is inserted between the fish plates B and the rail web and the tongue 8 and abutment 11 will thus assume positions at opposite sides of the nut to be tightened, the head of the bolt nearest the adjacent end of the fish plate being located in the angle formed by the parts 10 and 11 of the lock. When the nut is tightened the tongue 8 and the abutment 11 will be pressed out of the path of the corners thereof but, when an effort is made to turn the nut in the opposite direction, the tongue 8 and abutments 11 will securely hold the nut against movement.

If desired, the arm 7 may be formed with a depression 12 into which the corner portions of the nut may move while being rotated, this depression corresponding with the depression shown at 4 in Fig. 3. It will be seen that by employing the two sets of locks such as have been described, the four nuts used upon the bolts extending through the fish plate can be securely fastened.

Although the lock has been shown in connection with a square nut, it is to be understood that the same can be used with either a hexagonal or an octagonal nut.

It is to be understood that various changes may be made in the construction and arrangement of the parts without departing from the spirit or sacrificing any of the advantages of the invention as defined in the appended claims.

What is claimed is:—

1. A nut lock including an intermediate hooked fish plate engaging portion, and spaced yielding terminals for simultaneously engaging opposite portions of the same nut.

2. A nut lock having an intermediate hooked portion for engaging the end of a fish plate, and oppositely extending spaced terminal portions for simultaneously engaging opposite portions of the same nut.

3. A nut lock including a single length of resilient metal bent to form an arm, a fish plate engaging hooked portion, means at one end of the arm for engaging one side of a nut, and means extending from the hooked portion for engaging the opposite side of the same nut.

4. A nut lock including a single length of resilient material bent to form an arm, a fish plate engaging portion at one end of the arm, and separate means extending from said portion and from the other end of the arm for engaging opposed portions of the same nut to hold the nut against rotation in one direction.

5. A nut lock including an arm, a fish plate engaging portion at one end of the arm, and yielding means upon said portion and the other end of the arm for simultaneously engaging opposite portions of the same nut.

6. A nut lock including a single length of resilient material bent to form an intermediate hook for engaging one end of a fish plate, there being arms extending from said hook and adapted to contact with the outer face of the fish plate, each arm having a terminal portion for engaging a nut, said terminal portions being adapted to simultaneously engage opposed faces of the same nut.

In testimony that I claim the foregoing as my own, I have hereto affixed my signature in the presence of two witnesses.

MILTON C. THOMAS.

Witnesses:
ONA BURKET,
EMMA OXLEY.

---

Copies of this patent may be obtained for five cents each, by addressing the "Commissioner of Patents, Washington, D. C."